United States Patent [19]

Jeram et al.

[11] Patent Number: 5,122,562

[45] Date of Patent: Jun. 16, 1992

[54] HEAT CURABLE SILICONE RUBBER COMPOSITIONS

[75] Inventors: Edward M. Jeram, Burnt Hills; Brian J. Ward, Valley Falls, both of N.Y.

[73] Assignee: General Electric Company, Waterford, N.Y.

[21] Appl. No.: 587,876

[22] Filed: Sep. 25, 1990

[51] Int. Cl.$^5$ .............................................. C08K 3/10
[52] U.S. Cl. .................................. 524/403; 524/433; 524/588; 525/478
[58] Field of Search ................ 525/478; 524/403, 433, 524/588

[56] References Cited

U.S. PATENT DOCUMENTS

| | | | |
|---|---|---|---|
| 4,041,010 | 8/1977 | Jeram | 525/477 |
| 4,061,609 | 12/1977 | Bobear | 528/24 |
| 4,521,459 | 6/1985 | Penneck | 524/403 |
| 4,746,699 | 5/1988 | Modic | 525/478 |
| 4,774,297 | 9/1988 | Murakami et al. | 525/478 |
| 4,882,398 | 11/1989 | Mbah | 525/478 |
| 4,891,393 | 1/1990 | Hirai et al. | 525/478 |

*Primary Examiner*—John C. Bleutge
*Assistant Examiner*—Margaret W. Glass

[57] ABSTRACT

The present invention provides an improved heat curable silicone composition, having increased tear strength, oil resistance, and reduced compression set, comprising (A) a blend containing (1) a vinyl-containing organopolysiloxane or vinyl-containing organopolysiloxane blend having a viscosity of about 5,000 to about 500,000 centipoise at 25° C., and (2) a vinyl-containing organopolysiloxane or vinyl-containing organopolysiloxane blend having a viscosity of about 8,000,000 to about 100,000,000 centipoise at 25° C; (B) an organopolysiloxane resin copolymer; (C) an organic peroxide catalyst; (D) a filler; and (E) an organohydrogenpolysiloxane.

29 Claims, No Drawings

HEAT CURABLE SILICONE RUBBER COMPOSITIONS

BACKGROUND OF THE INVENTION

The present invention relates to heat curable silicone rubber compositions. More particularly, this invention relates to heat curable silicone rubber compositions having improved tear strength, oil resistance and compression set properties.

Heat curable silicone rubber compositions are known in the art. Such compositions are known for their ability to resist change at elevated temperature and exposure to adverse weather conditions over extended periods of time. In particular applications, however, such as automobile seals and gaskets, materials are needed which have not only the outstanding properties of organopolysiloxane elastomers but also have a satisfactory degree of toughness. Toughness can be measured by tear strength (pounds per inch, i.e. "pi"), which is the ability of the rubber to withstand continual abrasion without breakdown in mechanical structure. In addition to toughness, elastomeric materials for use in automobiles must have a satisfactory degree of resiliency or ability to recover shape after deformation especially by compressive forces.

Efforts have been undertaken in the past to produce heat curable silicone elastomer compositions having increased tear strength and reduced compression set properties.

For example, U.S. Pat. No. 4,539,357 (Bobear '357) discloses a heat-curable silicone composition comprising a vinyl-terminated linear diorganopolysiloxane gum having a viscosity in the range of $1 \times 10^6$ to $20 \times 10^7$ centipoise at 25° C., a vinyl-containing diorganopolysiloxane gum having a viscosity varying from $1 \times 10^6$ to $20 \times 10^7$ centipoise at 25° C., a filler, a hydride-containing polysiloxane, and an organic peroxide or organic hydroperoxide curing agent. The composition may further comprise a vinyl-containing organopolysiloxane resin copolymer. It is stated in Bobear '357 at column 6, lines 22-29 that there should be no vinyl-containing fluid in the composition since it has been found that compositions containing vinyl-containing fluids of a viscosity of 500,000 centipoise or less result in elastomers with good tear strength initially, but after the composition has been subjected to post-cure, its tear strength properties degrade dramtically. After post-cure, the Bobear '357 composition has a tear strength of above 200 pi.

U.S. Pat. No. 3,652,475 to Wada et al. (Wada) discloses heat curable elastomeric silicone compositions reportedly having high tear strength, excellent compression set and resiliency, comprising two vinyl-unsaturated polydiorganosiloxanes each having a degree of polymerization of at least 3000; a vinyl-unsaturated polydiorganosiloxane having a degree of polymerization of from 10 to 1000; a silica filler; and an organic peroxide catalyst. The samples prepared in the Wada examples had tear strength values of about 40 kg/cm, i.e., about 225 pi.

U.S. Pat. No. 3,671,480 to Wada et al. (Wada) discloses a heat curable elastomeric silicone composition having improved tear strength and superior compression set, comprising a mixture of two vinyl-unsaturated polydiorganosiloxanes, one of which appears to have a high molecular weight and the other of which appears to have a low molecular weight; a polyorganohydrogensiloxane; silica filler; and a platinum compound. The examples in Wada report tear strength values of about 50 kg/cm, i.e., about 280 pi. Compression set values are not given.

U.S. Pat. No. 4,061,609 to Bobear discloses a platinum catalyzed silicone rubber composition comprising a vinyl-containing polysiloxane or a blend of such polysiloxanes; platinum; and a hydrogen-containing polysiloxane. Preferably, the vinyl-containing polysiloxane has a viscosity in the range of 1000 to 300,000,000. A low viscosity vinyl-containing polysiloxane may be added to the basic composition as a reinforcing agent to give the final composition good physical strength. Claim 4 in Bobear recites a first polysiloxane having a viscosity of 1,000,000 to 200,000,000 centipoise at 25° C. and a second polysiloxane having a viscosity of 50,000 to 500,000 centipoise at 25° C. The Bobear patent is directed to improving the work life of silicone rubber compositions, rather than tear strength. In the examples, tear strength values of greater than 200 pi were obtained, but the compositions having these values contained two high viscosity vinylpolysiloxanes rather than one high viscosity vinylpolysiloxane and one low viscosity vinylpolysiloxane.

U.S. Pat. No. 3,660,345 to Bobear discloses organopolysiloxane compositions which are convertible to elastomers having high tear strength and resiliency, comprising a two component blend of vinyl-containing organopolysiloxanes; silica filler, and a process aid which can be, for example, a methoxy-terminated polysiloxane, a silanol-terminated polydimethylsiloxane, or hexamethyldisilazane. A peroxide is used as the catalyst. The viscosity of one of the two vinyl-containing organopolysiloxanes can be in the range of 1 to 1 billion centipoise at 25° C., while the viscosity of the other can be between 100,000 to 2,000,000,000 centipoise at 25° C. The examples in Bobear report tear strength values of greater than 200 pi.

U.S. Pat. No. 3,696,068 to Creamer discloses heat-curable silicone gumstock compositions having high die "B" tear strength as well as low compression set values, comprising a vinyl-containing diorganopolysiloxane gum and a linear vinyl-containing fluid having a viscosity of from 10 to 150,000 centistokes at 25° C. The crosslinkable vinyl siloxane gum has a viscosity in excess of 200,000 centistokes at 25° C. The Creamer composition is cured by a peroxide catalyst. Some of the samples prepared in Creamer had tear strength values in excess of 150 pi. Tear strength after post cure was not measured in any of the examples, which is significant since, as pointed out previously herein, it has been found that, in compositions containing low viscosity vinyl-containing fluids, tear strength drops dramatically after post cure.

U.S. Pat. No. 3,884,866 to Jeram et al. (Jeram) discloses a high strength organopolysiloxane composition suited for low pressure injection molding, comprising (A) a first component containing (i) a vinyl-containing high viscosity organopolysiloxane having a viscosity of 5000 to 1,000,000 centipoise at 25° C.; and (ii) a low viscosity vinyl-containing organopolysiloxane having a viscosity of 50 to 5000 centipoise at 25° C.; (iii) a filler; and (iv) a platinum catalyst; and (B) a hydrogen silicone composition. The highest tear strength reported in the examples was 250 pi.

Although heat curable silicone rubber compositions having good tear strength and low compression set properties are known in the art, it is continually desirable to provide heat curable silicone rubber compositions having improved tear strength and compression set properties.

Therefore, it is an object of the present invention to provide a heat curable silicone rubber composition with higher tear strength and lower compression set than the silicone rubber compositions described above.

It is a further object of the present invention to provide an oil resistant heat curable silicone rubber composition having high tensile strength and elongation properties in addition to high tear strength and reduced compression set.

These objects are achieved in the present invention.

SUMMARY OF THE INVENTION

The present invention is based on the discovery that the combination of a vinyl-containing organopolysiloxane resin of the type described hereinafter, a vinyl-containing diorganopolysiloxane fluid having a viscosity of from about 5,000 to about 500,000 centipoise at 25° C., and a vinyl-containing diorganopolysiloxane gum having a viscosity of from about 8,000,000 to about 100,000,000 centipoise at 25° C., will cure in the presence of an organic peroxide catalyst and a linear organohydrogenpolysiloxane to form a heat cured silicone elastomer having high tear strength, i.e. greater than 250 pi, even after post-cure baking, and low compression set properties, i.e. less than 15%.

The present invention provides an heat curable silicone rubber composition having increased tear strength and reduced compression set, comprising by weight:

(A) 100 parts of a blend comprising by weight:

(1) from about 5 to about 50% of a vinyl-containing organopolysiloxane or a vinyl-containing organopolysiloxane blend, wherein the vinyl-containing organopolysiloxane or the vinyl-containing organopolysiloxane blend has a viscosity of about 5,000 to about 500,000 centipoise at 25° C.; and (2) from about 50 to about 95% of a vinyl-containing organopolysiloxane or a vinyl-containing organopolysiloxane blend wherein the vinyl-containing organopolysiloxane or the vinyl-containing organopolysiloxane blend has a viscosity of about 8,000,000 to about 100,000,000 centipoise at 25° C.;

(B) from about 1 to about 30 parts based on component (A) of an organopolysiloxane resin copolymer comprising (1) $R_3SiO_{\frac{1}{2}}$ units and $SiO_2$ units where R is selected from the group consisting of vinyl radicals and monovalent hydrocarbon radicals free of aliphatic unsaturation with a ratio of $R_3SiO_{\frac{1}{2}}$ units to $SiO_2$ units ranging from about 0.5:1 to about 1.5:1, wherein the copolymer contains from about 0.5 to 10 weight percent vinyl groups; or (2) $R_3SiO_{\frac{1}{2}}$ units, $SiO_2$ units, and $R_2SiO_{2/2}$ units, where R is as defined above, where the ratio of $R_3SiO_{\frac{1}{2}}$ units to $SiO_2$ units is from about 0.5:1 to about 1.5:1, and the $R_2SiO_{2/2}$ units are present in an amount of from about 1 to 70 mole percent based on the total number of moles of siloxy units in the copolymer, and where the resinous copolymer contains from about 0.5 to 10.0 weight percent vinyl groups, or (3) mixtures of the units of (1) and (2);

(C) from about 0.1 to about 5.0 parts based on component (A) of an organic peroxide free radical curing catalyst, (D) from about 5.0 to about 200 parts based on component (A) of a filler; and (E) from 0.1 to 10 parts based on component (A), of an organohydrogensiloxane having a hydrogen content ranging from about 0.05 to 2.0 percent by weight and having a viscosity ranging from about 5 to about 500 centipoise at 25° C.

The heat curable compositions of this invention have good tear die B and compression set properties without a sacrifice in other beneficial physical properties, e.g., oil resistance, tensile strength, hardness, and elongation.

DETAILED DESCRIPTION OF THE INVENTION

The present invention is directed to a heat curable silicone composition having improved compression set and tear strength properties, containing (A) a blend containing (1) a vinyl-containing diorganopolysiloxane or a vinyl-containing diorganopolysiloxane blend, wherein the vinyl-containing diorganopolysiloxane or a vinyl-containing diorganopolysiloxane blend has a viscosity of from about 5000 to about 500,000 centipoise at 25° C. and (2) a vinyl-containing diorganopolysiloxane or a vinyl-containing diorganopolysiloxane blend, wherein the vinyl-containing diorganopolysiloxane or vinyl-containing diorganopolysiloxane blend has a viscosity of from about 8,000,000 to about 100,000,000 centipoise at 25° C.; (B) an organopolysiloxane resin copolymer; (C) an organic peroxide catalyst; (D) filler; and (E) an organohydrogenpolysiloxane.

The composition of this invention contains 100 parts of a blend comprising (1) from about 5 to about 50, preferably from about 10 to about 40, and most preferably from about 15 to about 25 parts by weight of (A) of a vinyl-containing diorganopolysiloxane or a vinyl-containing diorganopolysiloxane blend having a viscosity of from about 5000 to about 500,000 centipoise at 25° C. and (2) from about 50 to about 95, preferably from about 55 to about 90, and most preferably from about 60 to about 80, parts by weight of a vinyl-containing diorganopolysiloxane or a vinyl-containing diorganopolysiloxane blend having a viscosity of from about 8,000,000 to about 100,000,000 centipoise at 25° C.

Component (A) (1) is a vinyl-containing diorganopolysiloxane or a vinyl-containing diorganopolysiloxane blend having a viscosity of from about 5000 to about 500,000, preferably from about 40,000 to about 500,000, and most preferably from about 60,000 to about 150,000, centipoise at 25° C. The vinyl-containing polymer or blend of component (A) (1) has a vinyl concentration in the range of from about 0.001 to about 10.0, preferably from about 0.01 to about 1.0, and most preferably from about 0.04 to about 0.10, weight percent. The organo groups in the vinyl polymer or blend of polymers are monovalent hydrocarbon radicals.

The vinyl polymer or polymers of component (A)(1) can be vinyl-terminated and can contain vinyl-on-chain units. In preferred embodiments, however, the vinyl polymer has no vinyl-on-chain units. Preferably, the vinyl polymer of component (A)(1) has the formula:

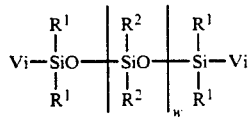

wherein Vi is vinyl, $R^1$ is selected from the class consisting of vinyl, phenyl, alkyl radicals of 1 to 8 carbon atoms, and fluoroalkyl radicals of 3 to 10 carbon atoms and mixtures thereof, and $R^2$ is an alkyl radical of 1 to 8 carbon atoms or a fluoroalkyl radical of 3 to 10 carbon atoms or mixtures thereof, w varies such that the viscosity of (A)(1) ranges from about 5,000 to about 500,000 centipoise at 25° C., the vinyl concentration being in the range of from about 0.001 to about 10 weight percent.

Examples of alkyl radicals which can be represented by $R^1$ and $R^2$ include methyl, ethyl, and propyl radicals. An example of a fluoroalkyl radical is 3,3,3-trifluoropropyl. Preferably, $R^1$ is either vinyl or methyl, and $R^2$ is methyl.

Component (A)(2) is a vinyl-containing diorganopolysiloxane or a vinyl-containing diorganopolysiloxane blend wherein the vinyl-containing diorganopolysiloxane or blend has a viscosity of about 8,000,000 to about 100,000,000, preferably from about 20,000,000 to about 35,000,000, and most preferably from about 25,000,000 to about 30,000,000, centipoise at 25° C. Component (A)(2) has a vinyl concentration in the range of from about 0.001 to about 0.1, preferably from about 0.002 to about 0.008, and most preferably from about 0.003 to about 0.006, weight percent. The organo groups in the vinyl polymer or polymers of component (A)(2) are monovalent hydrocarbon radicals.

The vinyl polymer or polymers of Component (A)(2) may contain vinyl-on-chain groups and vinyl endgroups. Preferably, the polymer is just vinyl-terminated. In preferred embodiments, the vinyl polymer of Component (A)(2) has the formula:

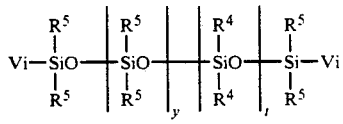

wherein Vi is vinyl, $R^4$ is a $C_{1-8}$ monovalent hydrocarbon radical free of aliphatic unsaturation, $R^5$ is a $C_{1-8}$ monovalent hydrocarbon radical, y and t vary such that the viscosity of component (A)(2) ranges from about 8,000,000 to about 100,000,000 centipoise at 25° C. and having a vinyl concentration in the range of from about 0.001 to about 0.1 weight percent.

The radical $R^4$ can be any of the radicals given for radical $R^2$ in formula (2) above. The radical $R^5$ can be any of the radicals given for radical $R^1$ in formula (2) above.

The vinyl-containing polymers of Components (A)(1) and (A)(2) can be made by a process well known in the art such as, for instance, by reacting cyclotetrasiloxanes in the presence of low molecular weight linear vinyl chain stoppers at high temperatures in the presence of basic catalysts so as to yield the polymer of the desired molecular weight. When the reaction is over, the catalyst is neutralized and the excess cyclics vented off to result in the desired polymer. By controlling the amount of chain stopper and the temperature of reaction, the molecular weight of the desired vinyl-containing polymer end product can be controlled. For more details of the process by which such vinyl-containing polymers are produced, reference is made, for example, to U.S. Pat. No. 3,660,345, which is hereby incorporated by reference herein.

Component (A)(2) is present in the blend of component (A) in an amount within the range of from about 50 to about 95, preferably from about 55 to about 90, and most preferably from about 60 to about 80, parts by weight.

Component (B) is an organopolysiloxane resin copolymer. The resin copolymer may contain (1) $R_3SiO_{\frac{1}{2}}$ monofunctional units and $SiO_2$ tetrafunctional units, where R is selected from the group consisting of vinyl radicals and monovalent hydrocarbon radicals free of aliphatic unsaturation with a ratio of $R_3SiO_{\frac{1}{2}}$ units to $SiO_2$ units ranging from about 0.5:1 to about 1.5:1, wherein about 0.5 to 10 weight percent of the silicon atoms contain silicon bonded vinyl groups; or the organopolysiloxane resin copolymer may contain (2) $R_3SiO_{\frac{1}{2}}$ monofunctional units, $SiO_2$ tetrafunctional units and $R_2SiO_{2/2}$ difunctional units where R is selected from the group consisting of vinyl radicals and monovalent hydrocarbon radicals free of aliphatic unsaturation, where the ratio of $R_3SiO_{\frac{1}{2}}$ units to $SiO_2$ units is from about 0.5:1 to about 1.5:1, and the $R_2SiO_{2/2}$ units are present in an amount of from about 1 to 70 mole percent based on the total number of moles of siloxy units in the copolymer, the resinous copolymer containing from about 0.5 to 10.0 weight percent vinyl groups; or the organopolysiloxane resin copolymer may contain (c) a mixture of (1) and (2).

The organopolysiloxane resin copolymers present in the composition of this invention are known and are produced by methods well known in the art. Such resins are usually produced by hydrolysis of the appropriate chlorosilanes in a method well known in the art. For further information as to such resins, reference is made, for example, to U.S. Pat. No. 3,436,366 (Modic), which is incorporated by reference herein.

Component (B) is present in the composition of this invention in an amount ranging from about 1.0 to about 30, preferably from about 1.0 to about 20, and most preferably from about 2.5 to about 10, parts by weight based on (A).

Component (C) is an organic peroxide free radical initiator curing catalyst. The preferred peroxide curing agents are organic peroxides conventionally used to cure silicone elastomers. Examples of suitable organic peroxide catalysts for use in the present invention are disclosed, for example, in U.S. Pat. No. 4,539,357 to Bobear, which is hereby incorporated by reference herein. Suitable peroxide catalysts include dialkyl peroxides, such as di-tertiary-butyl peroxide, tertiary-butyl-triethylmethyl peroxide, tertiary-butyl-tertiary-butyl-tertiary-triphenyl peroxide, t-butyl perbenzoate and a di-tertiary alkyl peroxide such as dicumyl peroxide. The preferred dialkyl peroxide is 2,5-dimethyl-2,5-bis(t-butylperoxy)hexane. The most preferred peroxides are the vinyl specific peroxides and the ones that have been found to give the best curing tear strength composition are, for instance, 2,5-dimethyl-2,5-di(t-butylperoxy)hexane, 2,5-dimethyl-2,5-di(t-butylperoxy)hexyne-3, di-t-butylperoxide, 5-butylcumylperoxide, alpha, alpha prime bis(t-butylperoxy)di-isopropylbenzene.

In the molding of typical silicone compositions, molding temperatures are usually about 400° F. Under such conditions a single peroxide catalyst is used. However, molding cycle times necessary to achieve final cure in the mold are considered to be excessive. To decrease cycle times, therefore, molders will remove the composition from the mold prior to complete cure, necessitating a post bake step to achieve final cure. This post bake step is necessary because residual peroxide catalyst in the material will continue to catalyze the reaction until the peroxide catalyst has decomposed to noncatalytic products, as determined by the temperature "halflife" of the peroxide.

In order to eliminate the post bake step, it has been found preferable to use a combination of peroxide catalysts comprising is high temperature peroxide catalyst and a low temperature peroxide catalyst. The function of the low temperature peroxide catalyst is to quickly catalyze the reaction at the molding temperature which is as low as 320° F. and allow the material to achieve a degree of crosslinking such that the material retains its shape after removal from the mold. Thus, the low temperature peroxide achieves partial crosslinking at the mold temperature in a very short period of time.

The high temperature peroxide catalyst uses the residual heat of the silicone elastomer after it has been removed from the mold to continue crosslinking to final cure. Thus, since the material continues to crosslink at low temperatures, i.e. lower than molding temperatures, the post bake step becomes unnecessary.

By the terms "low temperature peroxide" and "high temperature peroxide", reference is being drawn to the temperature half life of the peroxide. It is perferable that the high temperature peroxide have a ten hour half life at greater than 110° C. It is also preferable that the low temperature peroxide have a ten hour half life at 110° C. or less. It is more preferable that the high temperature peroxide have a ten hour half life at 115° C. or greater and the low temperature peroxide have a ten hour life at 100° C. or less.

It has been found that using a combination of a low and a high temperature peroxide catalysts imparts unusually low compression set values to the cured silicone elastomer without sacrifice of durometer, tensile, or elongation. It has also been found that molding temperatures may be decreased if the low temperature peroxide catalyst itself activates at lower temperatures. That is, molding has been accomplished at a temperature as low as 320° F. while maintaining a low compression set. There is no reason that molding may not be accomplished at still lower temperatures as long as the proper high and low temperature peroxides are chosen.

It is preferable that the peroxides chosen do not decompose into acids. Acid decomposition products have been found to adversely affect compression set. It has been found that 1,1-bis(t-butyl peroxy)-3,3,3-trimethyl-cyclohexane works well as the low temperature peroxide catalyst. It has also been found that 2,5-dimethyl-2,5,-di(t-butyl peroxy) hexane works well as the high temperature peroxide catalyst.

Component (D) of the composition of this invention comprises from about 5 to about 200, preferably from about 10 to about 100, and most preferably from about 30 to about 70, parts based on (A) of a reinforcing filler. A reinforcing filler is needed in the composition if the composition is to have high tear strength. Examples of reinforcing fillers that can be used include, for instance, fumed silica and precipitated silica, with fumed silica being preferred. The fumed silica or preciptitated silica can be treated with various agents so as to prevent the uncured composition from structuring, for example, cyclopolysiloxanes as disclosed in U.S. Pat. No. 2,938,009 to Lucas and silazanes as disclosed in U.S. Pat. No. 3,635,743 to Smith.

Extending fillers can be used in combination with the reinforcing fillers, treated or untreated, to get the proper balance in final physical properties in the silicone elastomer. These include, for example, titanium dioxide, lithopone, zinc oxide, zirconium silicate, silica aerogel, iron oxide, diatomaceous earth, calcium carbonate, glass fibers, magnesium oxide, chromic oxide, zirconium oxide, aluminum oxide, alpha quartz, calcined clay, carbon, graphite, cotton, synthetic fibers, aluminum silicate, and calcium silicate.

Component (E) is an organohydrogenpolysiloxane present in an amount ranging from about 0.1 to about 10.0, preferably from about 0.5 to about 8.0, and most preferably from about 0.8 to about 5.0, percent by weight and having a viscosity ranging from about 5 to about 500, preferably from about 10 to about 100, and most preferably from about 10 to about 50, centipoises at 25° C. Preferably, the hydride polysiloxane is a linear diorganopolysiloxane polymer having the formula

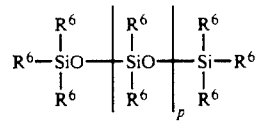

wherein $R^6$ is hydrogen or a $C_{1-8}$ monovalent hydrocarbon radical free of aliphatic unsaturation, p varies such that the viscosity of the organohydrogenpolysiloxane varies from 10 to 100 centipoise at 25° C. and the hydrogen content of the polymer varies from 0.05 to 2.0 percent by weight.

The linear hydride described above can be made by many procedures which are known in the art, and particularly by the hydrolysis of the appropriate chlorosilanes. For more information as to the production of such hydrides, reference is made, for example, to U.S. Pat. No. 4,041,010, which is hereby incorporated by reference herein.

Another type of hydride cross-linking agent that can be used in this invention is a hydride resin containing monovalent $HR_2^7SiO_{\frac{1}{2}}$ and tetravalent $SiO_2$ units wherein $R^7$ is a $C_{1-8}$ monovalent hydrocarbon radical free of aliphatic unsaturation, the $R^7+H$ to Si ratio varies from 1.0 to 2.7, the hydrogen content of the resin varies from 0.05 to 2.0 weight percent. It should be noted that the $R^7$ radical can be any of the radicals previously given for the $R^6$ radical in formula (3) above. The resin of formula (4) can be made by hydrolysis of the appropriate chlorosilanes and purification thereof.

Another type of hydride resin is one having difunctional units. This resin contains $HR^7SiO_{\frac{1}{2}}$ monofunctional units, $SiO_2$ tetrafunctional units, and $R_2^7SiO_{2/2}$ difunctional units, wherein the $R^7+H$ to Si ratio varies from 1.2 to 2.7 and $R^7$ is as defined above, and the hydrogen concentration varies from about 0.05 to about 2.0 percent by weight.

The hydride resin containing difunctional siloxy units can be produced by methods well known in the art as described in U.S. Pat. No. 4,041,010. which is hereby incorporated by reference herein.

Component (E) is present in the composition of the present invention in an amount ranging from about 0.1 to about 10, preferably from about 0.5 to about 8, and most preferably from about 0.8 to about 5, parts by weight based on (A).

The composition may further comprise from about 0.5 to about 20, preferably from about 1 to about 10, and most preferably from about 1 to about 4, parts by weight based on (A) of (F) magnesium oxide, which is used to impart oil resistance to the elastomer. It should be noted that, since magnesium oxide is a known filler, if added in amounts greater than 10 parts it will act more like a filler than an oil resistant additive.

The composition of this invention may further contain about 0.01 to about 20, preferably from about 0.5 to about 5, and most preferably from about 0.5 to about 2, parts by weight of (G) a cerium-containing compound. The cerium-containing compound acts tends to reduce the compression set of the elastomer. Even though the use of a dual peroxide catalytic system imparts low compression set, the use of magnesium oxide will adversely affect this and cause an increase in compression set. It has been found, however, that the use of magnesium oxide may be offset by using a cerium containing compound. It is theorized that cerium will complex with the silicone polymer, the filler, or both to improve the compression set of the silicone elastomer.

What has been found to be particularly useful in this regard has been cerium hydroxide ($Ce(OH)_4$). In order to work, however, it is necessary for the cerium hydroxide to undergo a heating step in order to drive off water and allow the cerium to complex with the silicone.

There is no limit to the amount of cerium hydroxide that may be added to lower compression set. An excess will not negatively affect compression set values. It should be noted, however, that if added in amounts greater than 10 parts the cerium hydroxide will act more like a filler than a low compression set additive.

An alternative to using cerium hydroxide involves the use of tetramethyldivinyldisilazane to impart low compression set. In order to impart low compression set, there should be added from about 0.01 to about 10 parts by weight tetramethyldivinyldisilazane per 100 parts components (A) and (B). Preferably, there is added from about 0.01 to about 1 part by weight tetramethyldivinyldisilazane per 100 parts components (A) and (B).

In order to demonstrate various features of this invention, the following examples are submitted. They are for illustrative purposes and are not intended to limit in any way the scope of this invention.

EXPERIMENTAL

In the tables below, the term "Polymer/Resin #1" refers to a resin/polymer blend containing 75 parts by weight of a vinyl-terminated polydimethylsiloxane polymer having a viscosity of 85,000 centipoises at 25° C. and a vinyl content of 0.055 weight percent, and 25 parts by weight of a vinyl-containing "MQ" resin ("M" refers to monofunctional $(CH_3)_3SiO_{\frac{1}{2}}$ units and "Q" refers to tetrafunctional $SiO_{4/2}$ units). The term "Polymer/Resin #2" refers to a resin/polymer blend containing 75 parts by weight of vinyldimethyl-stopped polydimethylsiloxane having a viscosity of 4000 centipoises at 25° C. and a vinyl content of 0.15 weight percent, and 25 parts by weight of a vinyl-containing MQ resin.

The term "LVVP" refers to a low viscosity vinyl-stopped dimethyl polymers of the type used in Resin/Polymer #1 and Resin/Polymer #2. It is to be understood that the polymer represented by the term "LVVP" is a separate and distinct polymer from those used in Resin/Polymer #1 and #2.

The term "HVVP" refers to a high viscosity vinyl-terminated dimethylpolysiloxane gum having a viscosity of 30,000,000 centipoises at 25° C. The catalyst used in the examples was 2,5-dimethyl-2,5-bis(t-butylperoxy)hexane. The SiH-crosslinker was a hydride linear polysiloxane having hydride terminal groups and hydride on-chain groups and a viscosity of 50 centipoise at 25° C. The filler used in the examples below was fumed silica treated with octamethylcyclotetrasiloxane ($D_4$).

The term "Resin" refers to a vinyl-containing MQ resin of the type used in Resin/Polymer #1 and Resin/Polymer #2. It is to be understood that the resin represented by the term "Resin" is a separate and distinct resin from those used in Resin/Polymer #1 and #2.

EXAMPLES 1-5

Five samples were prepared having the formulations set forth in Table 1 below. The compositions were prepared by mixing the ingredients and then molding the mixtures for 10 minutes at 350° F.

All parts are by weight.

TABLE 1

| Examples 1-5: Composition | | | | | |
|---|---|---|---|---|---|
| | Example No. | | | | |
| | 1 | 2 | 3 | 4 | 5 |
| Resin/Polymer #1 | 20 | 0 | 0 | 0 | 0 |
| Resin/Polymer #2 | 0 | 20 | 0 | 0 | 0 |
| HVVP | 80 | 80 | 80 | 80 | 95 |
| LVVP | 0 | 0 | 15 | 20 | 0 |
| Resin | 0 | 0 | 5 | 0 | 5 |
| Catalyst | 0.4 | 0.4 | 0.4 | 0.4 | 0.4 |
| SiH Crosslinker | 1.8 | 1.8 | 1.8 | 1.8 | 1.8 |
| Filler | 26 | 26 | 26 | 26 | 26 |

The tensile strength ("tensile"), modulus ("100% Mod."), elongation, hardness, specific gravity ("SQ"), tear die B, and compression set properties of the samples prepared in Examples 1-5 were measured and the results presented in Table 2 below.

TABLE 2

| Examples 1-5: Properties | | | | | |
|---|---|---|---|---|---|
| | Example No. | | | | |
| | 1 | 2 | 3 | 4 | 5 |
| Tensile (psi) | 1389 | 1250 | 1350 | 1300 | 1297 |
| 100% Mod. | 143 | 150 | 120 | 85 | 92 |
| Elongation (%) | 856 | 730 | 860 | 900 | 945 |
| Hardness, Durometer | 44 | 46 | 40 | 35 | 35 |
| SQ | 1.14 | 1.14 | 1.14 | 1.13 | 1.14 |
| Die B, Tear Strength (pi) | 280 | 270 | 260 | 130 | 130 |
| Compression Set (%) | 13% | 13% | 13% | 18% | 22% |

The data presented in Table 2 above indicates that tear die B is significantly higher and the compression set is lower for the samples containing the combination of resin, high viscosity vinyl polymer, and low viscosity vinyl polymer (Examples 1-3) than for samples containing the polymer blend alone and no resin (Example 4) or samples containing resin and high viscosity vinyl polymer but no low viscosity vinyl polymer (Example 5).

Thus, it can be seen from the data summarized in Table 2 above that the combination of the resinous copolymer and the high viscosity and low viscosity vinyl polymers improves tear die B and compression set properties without sacrificing other beneficial physical properties.

EXAMPLES 6-10

Five samples having the compositions set forth in Table 3 below were prepared according to the method used in Examples 1-5 above. The "silanol-stopped fluid" referred to in Table 3 below is a silanol-stopped polydiorganosiloxane fluid having a viscosity of between 25-40 centistokes at 25° C. and a silanol content of between approximately 5.5% to 14.1%. All parts are by weight.

TABLE 3

Examples 6-10: Composition

| Ingredient | Example No. | | | | |
|---|---|---|---|---|---|
| | 6 | 7 | 8 | 9 | 10 |
| HVVP | 80.0 | 80.0 | 80.0 | 80.0 | 70.0 |
| Resin/Polymer #1 | 15.0 | 15.0 | 15.0 | 15.0 | 22.5 |
| Fumed silica (D4) | 26.0 | 26.0 | 35.0 | 26.0 | 40.0 |
| Si—H crosslinker | 1.2 | 1.2 | 1.2 | 1.8 | 1.2 |
| tetramethyl-divinylsilazane | 0.1 | 0.1 | 0.5 | 0.1 | 3.0 |
| silanol-stopped fluid | 2.0 | 2.0 | 2.0 | 3.0 | 2.0 |
| Ce(OH)4 | 1.0 | 1.0 | 1.0 | 1.0 | 1.0 |
| 2,5 dimethyl-2,5-bis(t-butylperoxy)hexane | 0.4 | 0.4 | 0.4 | 0.4 | 0.4 |
| MgO | 2.5 | 2.5 | 2.5 | 2.5 | 2.5 |
| Extending filler | 0.0 | 6.0 | 6.0 | 6.0 | 0.0 |

The samples prepared in Examples 6-10 were molded at 350° F. for 10 minutes. A second sample of Example 7 was prepared and post-baked for 4 hours at 400° F. This sample is represented as Example 11 in Table 4 below.

Table 4 summarizes the physical properties of the samples prepared in Examples 6-11.

TABLE 4

Examples 6-11: Physical Properties

| Property | Example No. | | | | | |
|---|---|---|---|---|---|---|
| | 6 | 7 | 8 | 9 | 10 | 11 |
| Compression set, % | 8.0 | 13.0 | 10.2 | 12.0 | 15.0 | 10.2 |
| Tear Die B, pi | 300.0 | 305.0 | 312.0 | 315.0 | 320.0 | 315 |
| Tensile, psi | 1200.0 | 1170.0 | 1390.0 | 1350.0 | 1380.0 | 1340 |
| Shore A | 42.0 | 41.0 | 56.0 | 45.0 | 61.0 | 47 |
| Elongation | 850.0 | 860.0 | 750.0 | 840.0 | 650.0 | 806 |
| Modulus, psi | 116.0 | 120.0 | 195.0 | 140.0 | 170.0 | 147 |

The data shown in Table 4 indicates that good compression set and tear die B properties are obtained using the combination of the resin and the high viscosity and low viscosity vinyl polymers, with tear strength not decreasing with post-bake.

After curing the elastomers of Examples 6, 7, and 8, the elastomer of Example 6 was immersed for 70 hours at 300° F. in #1 oil, Example 8 was immersed for 70 hours at 300° F. in #1 oil and #2 oil, and the elastomer of Example 7 was immersed for 168 hours at 300° F. in #1 oil and #3 oil. Tables 5-7 summarize the changes in physical properties for each of the examples.

TABLE 5

Changes in Physical Properties After Immersion in #1 Oil

| Test | Example | | |
|---|---|---|---|
| | 6 | 7 | 8 |
| Tensile (% change) | −12 | −11 | −12 |
| Elongation (% change) | −9 | −7 | −5 |
| Hardness (change) | −5 | −7 | −6 |
| % Volume Swell | +4 | +5 | +4 |

TABLE 6

Changes in Physical Properties After Immersion in #2 Oil

| Test | Example 8 |
|---|---|
| Tensile (% change) | −19 |
| Elongation (% change) | −10 |
| Hardness (change) | −9 |
| % Volume Swell | +10 |

TABLE 7

Changes in Physical Properties After Immersion in #3 Oil

| Test | Example 7 |
|---|---|
| Tensile (% change) | −58 |
| Elongation (% change) | −31 |
| Hardness (change) | −20 |
| % Volume Swell | +39% |

What is claimed is:

1. An improved heat curable silicone composition, having increased tear strength and reduced compression set, comprising by weight:
   (A) 100 parts of a blend comprising by weight:
      (1) from about 5 to about 50% of a vinyl-containing organopolysiloxane or vinyl-containing organopolysiloxane blend, wherein the vinyl-containing organopolysiloxane or vinyl-containing organopolysiloxane blend has a viscosity of about 5,000 to about 500,000 centipoise at 25° C.; and
      (2) from about 50 to about 95% of a vinyl-containing organopolysiloxane or vinyl-containing organopolysiloxane blend, wherein the vinyl-containing organopolysiloxane or vinyl-containing organopolysiloxane blend has a viscosity of about 8,000,000 to about 100,000,000 centipoise at 25° C.;
   (B) from about 1 to about 30 parts based on component (A) of an organopolysiloxane resin copolymer comprising
      (1) $R_3SiO_{\frac{1}{2}}$ units and $SiO_2$ units where R is selected from the group consisting of vinyl radicals and monovalent hydrocarbon radicals free of aliphatic unsaturation with a ratio of $R_3SiO_{\frac{1}{2}}$ units to $SiO_2$ units ranging from about 0.5:1 to about 1.5:1, wherein the copolymer contains from about 0.5 to 10 weight percent vinyl groups; or
      (2) $R_3SiO_{\frac{1}{2}}$ units, $SiO_2$ units, and $R_2SiO_{2/2}$ units, where R is as defined above, where the ratio of $R_3SiO_{\frac{1}{2}}$ units to $SiO_2$ units is from about 0.5:1 to about 1.5:1, and the $R_2SiO_{2/2}$ units are present in an amount of from about 1 to 70 mole percent based on the total number of moles of siloxy units in the copolymer, and where the resinous copolymer contains from about 0.5 to 10.0 weight percent vinyl groups, or
      (3) mixtures of the units of (1) and (2);

(C) from about 0.1 to about 5.0 parts based on component (A) of an organic peroxide free radical curing catalyst, (D) from about 5.0 to about 200 parts based on component (A) of a filler; and (E) from 0.1 to 10 parts based on component (A), of an organohydrogenpolysiloxane having a hydrogen content ranging from about 0.05 to 2.0 percent by weight and having a viscosity ranging from about 5 to about 500 centipoise at 25° C.

2. The composition of claim 1 wherein component (A)(1) has a viscosity of from about 40,000 to about 500,000 centipoise at 25° C.

3. The composition of claim 2 wherein component (A)(1) has a viscosity of from about 60,000 to about 150,000 centipoise at 25° C.

4. The composition of claim 1 wherein component (A)(1) has the formula:

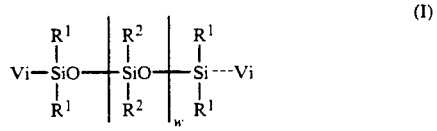

(I)

wherein Vi is vinyl, $R^1$ is selected from the class consisting of vinyl, phenyl, alkyl radicals of 1 to 8 carbon atoms, and fluoroalkyl radicals of 3 to 10 carbon atoms and mixtures thereof, and $R^2$ is an alkyl radical of 1 to 8 carbon atoms or a fluoroalkyl radical of 3 to 10 carbon atoms or mixtures thereof, w varies such that the viscosity of (A)(1) ranges from about 5,000 to about 500,000 centipoise at 25° C., the vinyl concentration being in the range of from about 0.001 to about 10 weight percent.

5. The composition of claim 1 wherein component (A)(1) is present in an amount ranging from about 10 to about 40 parts by weight based on (A).

6. The composition of claim 5 wherein component (A)(1) is present in an amount ranging from about 15 to about 25 parts by weight based on (A).

7. The composition of claim 1 wherein component (A)(2) has a viscosity of from about 20,000,000 to about 35,000,000 centipoise at 25° C.

8. The composition of claim 7 wherein component (A)(2) has a viscosity of from about 25,000,000 to about 30,000,000 centipoise at 25° C.

9. The composition of claim 1 wherein component (A)(2) has the formula:

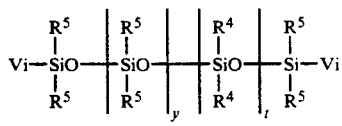

wherein Vi is vinyl, $R^4$ is a $C_{1-8}$ monovalent hydrocarbon radical free of aliphatic unsaturation, $R^5$ is a $C_{1-8}$ monovalent hydrocarbon radical, y and t vary such that the viscosity of component (A)(2) ranges from about 8,000,000 to about 100,000,000 centipoise at 25° C. and having a vinyl concentration in the range of from about 0.001 to about 0.1 weight percent.

10. The composition of claim 1 wherein component (A)(2) is present in an amount ranging from about 55 to about 90 parts by weight based on (A).

11. The composition of claim 10 wherein component (A)(2) is present in an amount ranging from about 60 to about 80 parts by weight based on (A).

12. The composition of claim 1 wherein component (B) is present in an amount ranging from about 1.0 to about 20 parts by weight based on (A).

13. The composition of claim 12 wherein component (B) is present in an amount ranging from about 2.5 to about 10 parts by weight based on (A).

14. The composition of claim 1 wherein the peroxide catalyst is a combination of peroxide catalysts comprising a high temperature peroxide catalyst and a low temperature peroxide catalyst.

15. The composition of claim 14 wherein the high temperature catalyst is 2,5-dimethyl-2,5-di(t-butyl peroxy) hexane and the low temperature catalyst is 1,1-bis(t-butyl peroxy)-3,3,3-trimethylcyclohexane.

16. The composition of claim 1 wherein the organic peroxide catalyst is selected from the group consisting of 2.5-dimethyl-2,5-di(t-butylperoxy)hexane, di-t-butylperoxide, 5-butylcumylperoxide; alpha, alpha prime bis(t-butylperoxy)diisopropylbenzene; 2,5-dimethyl-2,5-di(t-butylperoxy)hexyne-3.

17. The composition of claim 16 wherein the organic peroxide catalyst is 2,5-dimethyl-2,5-bis(t-butylperoxy)-hexane.

18. A composition according to claim 1 wherein the filler is a reinforcing filler selected from the group consisting of fumed silica and precipitated silica.

19. The composition of claim 1 wherein the filler is present in an amount ranging from about 10 to about 100 parts by weight based on (A).

20. The composition of claim 19 wherein the filler is present in an amount ranging from about 30 to about 70 parts by weight based on (A).

21. The composition of claim 1 wherein the organohydrogenpolysiloxane is a linear diorganopolysiloxane polymer having the formula

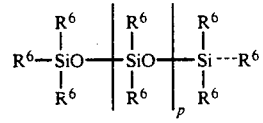

wherein $R^6$ is hydrogen or a $C_{1-8}$ monovalent hydrocarbon radical free of aliphatic unsaturation, p varies such that the viscosity of the organohydrogenpolysiloxane varies from 10 to 100 centipoise at 25° C., and the hydrogen content of the polymer varies from 0.05 to 2.0 percent by weight.

22. The composition according to claim 1 wherein the organohydrogenpolysiloxane is a hydride resin containing monovalent $HR_2^7SiO_{\frac{1}{2}}$ units and tetravalent $SiO_2$ units wherein $R^7$ is a $C_{1-8}$ monovalent hydrocarbon radical free of aliphatic unsaturation, the $R^7+H$ to Si ratio varies from 1.0 to 2.7, and the hydride content of the resin varies from 0.05 to 2.0 weight percent.

23. The composition of claim 1 wherein the organohydrogenpolysiloxane is a hydride resin containing $HR_2^7SiO_{\frac{1}{2}}$ units, divalent $(R^7)_2SiO_{2/2}$ units, and $SiO_2$ units, wherein $R^7$ is a $C_{1-8}$ monovalent hydrocarbon radical free of aliphatic unsaturation, the $R^7+H$ to Si ratio varies from 1.2 to 2.7, and the hydride content of the resin varies from 0.05 to 2.0 weight percent.

24. The composition of claim 1 wherein component (E) is present in an amount ranging from about 0.5 to about 8 parts by weight based on (A).

25. The composition of claim 24 wherein component (E) is present in an amount ranging from about 0.8 to about 5 parts by weight based on (A).

26. A composition according to claim 1 further comprising by weight (F) from about 0.5 to about 20 parts by weight based on (A) of magnesium oxide.

27. The composition of claim 26 wherein the magnesium oxide is present in an amount within the range of about 1 to about 10 parts by weight based on (A).

28. A composition according to claim 1 further comprising by weight (G) from about 0.01 to about 20 parts by weight based on (A) of (G) a cerium compound or from about 0.01 to about 10 parts by weight of tetramethyldivinyldisilazane.

29. The composition of claim 28 wherein the cerium compound is cerium hydroxide.

* * * * *